United States Patent [19]

Niederer

[11] 4,360,369

[45] Nov. 23, 1982

[54] APPARATUS FOR FILTERING PARTICULATES FROM A FLUID

[75] Inventor: Kurt W. Niederer, Charlotte, N.C.

[73] Assignee: The Terrell Machine Company, Charlotte, N.C.

[21] Appl. No.: 241,826

[22] Filed: Mar. 9, 1981

[51] Int. Cl.³ .............................................. B01D 46/00
[52] U.S. Cl. ....................................... 55/283; 55/290; 55/351; 55/400
[58] Field of Search ...................... 55/96, 97, 290, 283, 55/351, 400; 34/82

[56] References Cited

U.S. PATENT DOCUMENTS

| | | |
|---|---|---|
| 2,023,036 | 12/1935 | Taylor . |
| 3,183,647 | 5/1965 | Lang . |
| 3,212,239 | 10/1965 | Maestrelli . |
| 3,327,457 | 6/1967 | Linsel . |
| 3,343,342 | 9/1967 | Du Rocher . |
| 3,421,291 | 1/1969 | Messin-Jaschin . |
| 3,525,198 | 8/1970 | Weitzel . |
| 3,572,011 | 3/1971 | Wilhelmson . |
| 3,628,313 | 12/1971 | Broadbent ............................ 55/400 |
| 3,789,587 | 2/1974 | Moorefield . |
| 4,045,194 | 8/1977 | Ferri . |
| 4,090,857 | 5/1978 | Ferri et al. . |
| 4,226,715 | 10/1980 | Niederer et al. ...................... 55/283 |

FOREIGN PATENT DOCUMENTS 568780 11/1975 Switzerland .
912149 12/1962 United Kingdom .

Primary Examiner—Bernard Nozick
Attorney, Agent, or Firm—W. Thad Adams, III

[57] ABSTRACT

An apparatus is disclosed for separating entrained particulate matter from a conveying fluid. Particulate matter is collected and deposited in an overlying porous layer on an upstream side of a filter support (22) and then used as a filtering medium ("M") of enhanced filtering capacity. The invention includes a housing (10) having a filter support (22) positioned therein. A filter making zone (36) is defined within the housing (10) by fluid flow through a first predetermined part of the filter support (22) from its upstream to its downstream side for collecting the entrained particulate matter into an overlying porous layer. A filtration zone (37) is defined within the housing (10) by a fluid flow through a second predetermined part of the filter support (22) from the upstream to the downstream side thereof. The filter support (22) has thereon the overlying porous layer of particulate matter ("M") made in the filter making zone (36). The filter making zone (36) and the filtration zone (37) are defined by fluid flow.

7 Claims, 5 Drawing Figures

APPARATUS FOR FILTERING PARTICULATES FROM A FLUID

TECHNICAL FIELD AND BACKGROUND OF THE INVENTION

This invention relates to a apparatus for the high efficiency filtering of particulate matter from a conveying fluid, such as air. The concept disclosed also has application in the filtering of gasses, as well as liquids. Filtration takes place by building a mat or layer of particulate matter upon a filter support and then using the mat as a filter medium.

The particular disclosure of this application is of a filter for removing various types of dust and fibers such as are commonly found in textile processing environments from a conveying air stream.

It is well known in the filtration art that a bare filter, such as a screen or filter fabric is a poor filter, especially of fine dust and fiber particles. This problem is an inherent one in the prior art use of filter screens and fabrics since the reduction of the size of the filter opening to trap small particles results in rapid clogging of the filter, greater energy consumption to move air through the relatively small openings, and frequent removal of the accumulated particulates from the filter surface. In contrast, it is well known that, given optimum filter opening size, efficiency improves dramatically after the filter media has collected a sufficient amount of dust on the screen, since dust is its own best filter. As is apparent, however, the dust cannot be collected forever. Upon reaching an optimum mat thickness, filtration efficiency ceases to improve. Moreover, as the increasing thickness of the mat progressively impedes the flow of air through the filter, filtration capacity at any given energy consumption level quickly decreases. For this reason, the mat must be removed periodically from at least a portion of the fiber mat in order to facilitate passage of air through the filter. Whenever the mat is removed from a portion of the filter, the pressure drop through this area decreases relative to the portion of the filter still containing the mat. As a result, most of the air entering the filter will move toward the area of least resistance and will pass through the clean filter. The result is poor filtration efficiency until the mat of dust and fibers again begins to accumulate on the filter surface. The repeated necessity of removing a portion of the mat from the filter material results in relatively short periods of time during which filtering efficiency is very high, interrupted by relatively longer periods of time where filtration efficiency is very poor. Clearly, the average filtration efficiency over an extended period of time is much lower than the efficiency of the filter when the mat is at its optimum thickness.

A first step toward the solution of this problem is disclosed in a recent patent to the present assignee (U.S. Pat. No. 4,226,715, assigned to the Terrell Machine Company). The invention disclosed in the above-identified patent was invented by the present applicant, jointly with Robert E. Terrell. As disclosed in the U.S. Pat. No. 4,226,715, the area within the filter enclosure is divided into two physically separated chambers straddling the upstream and downstream sides of the filtering drum. The air to be filtered first enters the first chamber, passes through the filter medium and is removed on the downstream side of the chamber by fan into the upstream side of the physically separate second chamber. The air then passes through the fiber mat on the filter drum in the second chamber where it is again filtered, this time at a very high efficiency, and is then exhausted. The first and second chambers are physically separated by means of a rubber seal on the downstream side of the filter drum. The first and second chambers are physically separated on the upstream side of the filter drum by an imperforate wall and a polished, steel roller which engages the fiber mat and, under optimum conditions, prevents the intercommunication of air between the first and second chambers. However, it appears that a certain amount of dust and fiber was escaping from the filter which should have been trapped in the mat. It was first thought that the roller was not engaging the fiber mat tightly enough, permitting minute currents of air having relatively high velocities to pass through the mat at the point where engaged by the roller and removing and carrying through the downstream side of the second chamber particles of dust and fiber. However, when the roller was adjusted to more tightly engage the mat as it passed beneath, filtration efficiency decreased as a result of the steel roller crushing dust and fiber particles adjacent the filter drum, allowing them to escape into the downstream side of the second chamber.

It was then thought that the problem could be solved by loosening the roller. However, it was discovered that when air is permitted to leak between the roller and fiber mat, air currents erode and eventually remove sections from the fiber mat or, at the very least, result in uneven mat thickness. This again resulted in decreased filtering efficiency.

By operating the filter fan while the apparatus was partially disassembled, i.e., with the roller on the upstream side of the filter separating the first and second chambers removed, filtering efficiency was greatly improved. Experimentation with the physical barrier on the upstream side of the first and second chambers removed revealed that uniformity of mat thickness was enhanced and the problem of crushed dust and fiber particles escaping through the filter drum into the downstream side of the second chamber was completely eliminated.

SUMMARY OF THE INVENTION

Therefore, it is an object of the invention to provide an improved apparatus for separating entrained particulate matter from a conveying fluid wherein particulate matter is collected and deposited in an overlying porous layer on an upstream side of a fluid-permeable filter support and wherein the porous layer of particulate matter is used as a filtering medium of enhanced filtering capacity.

It is another object of the present invention to provide a apparatus for separating entrained particulate matter from a conveying fluid which produces a high level of filtration efficiency, thereby avoiding the necessity of using secondary filtering apparatus.

It is yet another object of the present invention to provide a apparatus which provides relatively constant air quality before, during and after periodic cleaning of the particulate matter from the filter surface.

These and other objects and advantages of the present invention are achieved in the preferred embodiment of the method and apparatus below by providing an enclosed housing having a fluid inlet and a fluid outlet. A filter support is positioned within the enclosed housing and removes at least some entrained particulate matter from the fluid as fluid is passed through the filter support from the upstream side to the downstream side. A filter making zone is defined within the enclosed housing by fluid flow into the inlet and through a first pre-determined part of the filter support from the upstream to the downstream side thereof. The filter support collects the removed particulate matter into an overlying porous layer. A filtration zone is defined within the enclosed housing by a fluid flow through a second pre-determined part of the filter support from its upstream to its downstream side, and through the filter outlet. The second pre-determined part of the filter support has thereon the overlying porous layer of particulate matter made in the filter making zone. The filter making zone and the filtration zone are defined and differentiated by fluid flow as opposed to the presence of any physical barrier.

Preferably, drive means are provided for moving the filter support in the filter making zone and the overlying layer thereon into the filtration zone. Doffing means are also provided for removing the layer of particulate matter from the filter support upon the completion of its passage through the filtration zone.

Also, fluid pumping means are preferably provided and operatively communicate with the enclosed housing for inducing a flow of fluid into the enclosed housing through the inlet and out of the enclosed housing through the outlet.

In accordance with the embodiment of the invention disclosed herein, the filter support comprises a cylindrical drum rotatably mounted in the housing.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

DESCRIPTION OF THE PREFERRED EMBODIMENT

Figure 1:
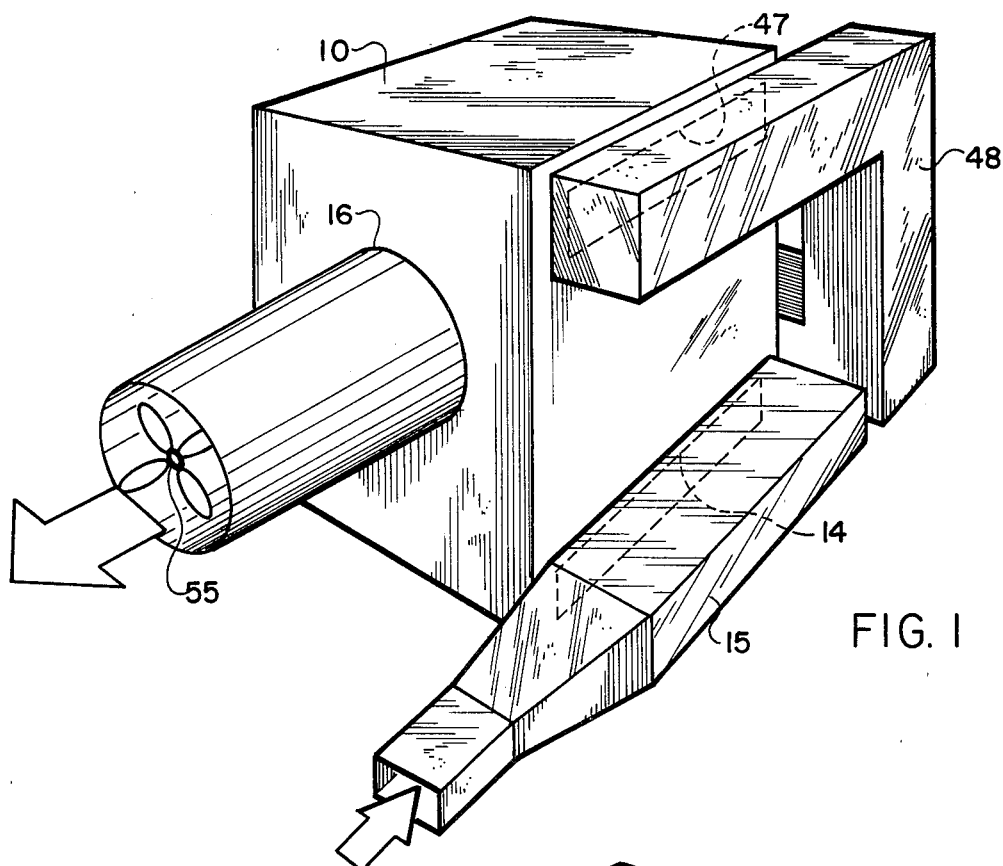
FIG. 1 is a perspective view of a preferred embodiment of the apparatus according to this invention.
Figure 2:
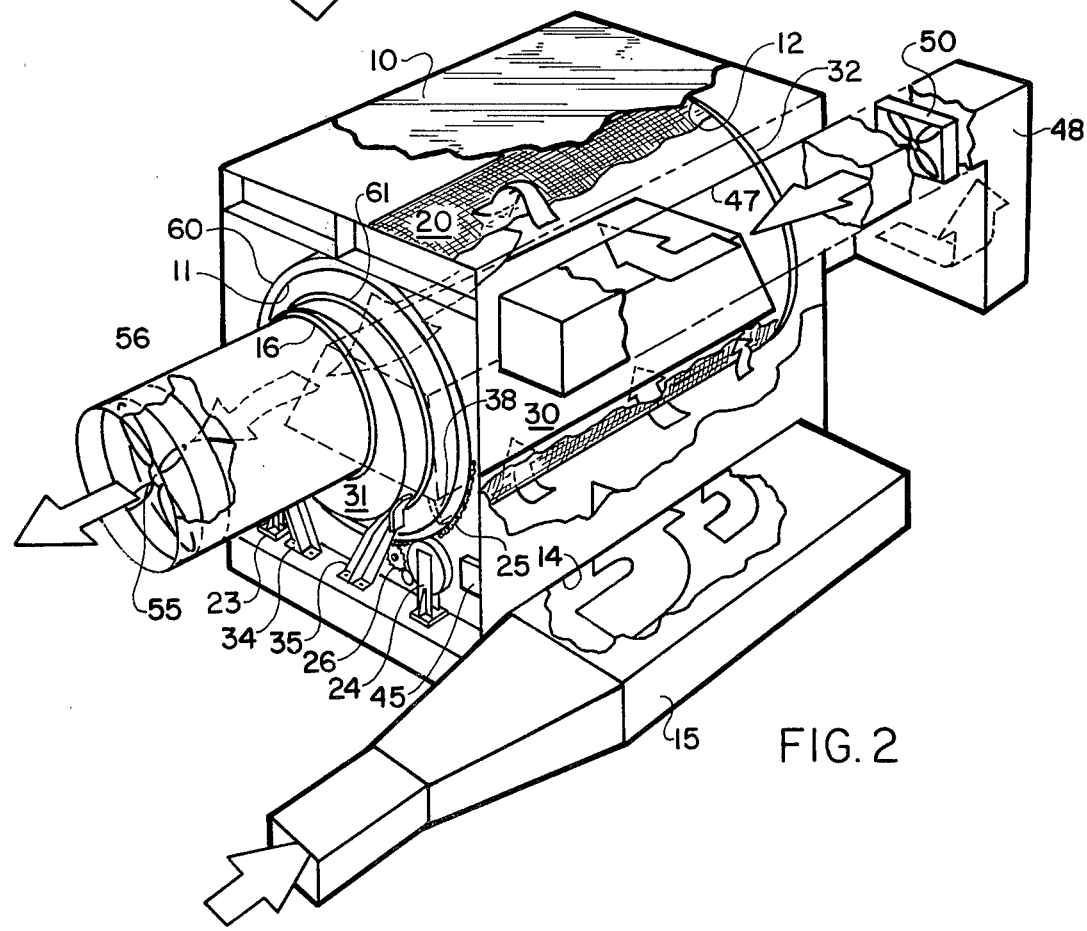
FIG. 2 is a perspective view of a preferred embodiment of the apparatus according to the present invention, with parts broken away to show details of the internal structure and the path of the air flow therethrough.
Figure 3:
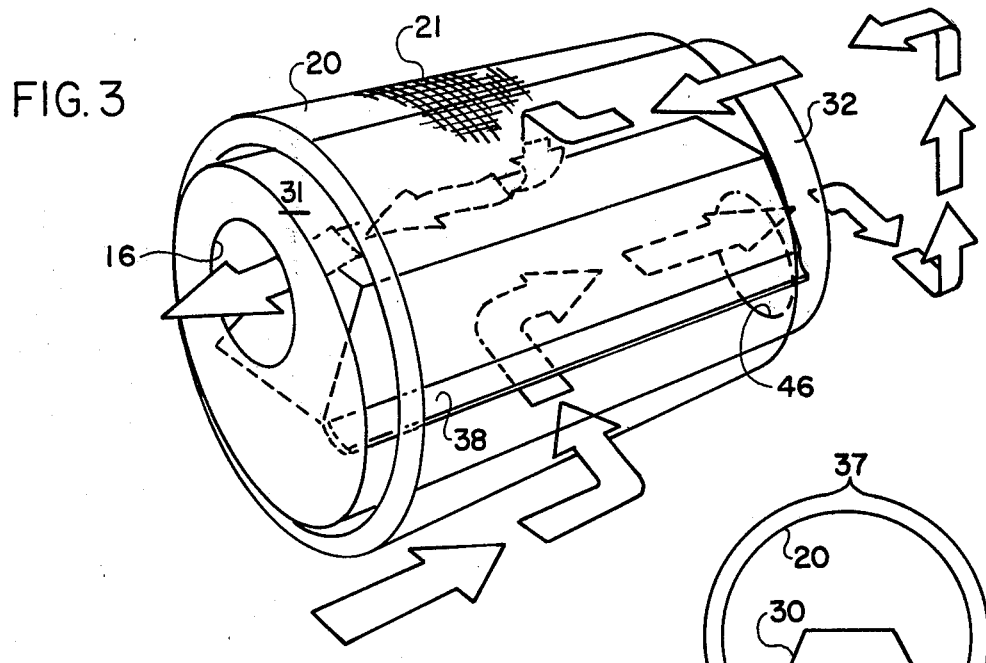
FIG. 3 is a perspective view, in schematic form, of the cylindrical filter support according to the present invention, with the air flow therethrough being indicated.

Referring now specifically to the drawings, a preferred embodiment of the filtering apparatus according to the present invention is shown in FIG. 1. A housing 10 is shown which encloses the filtration components of the invention. As is shown in FIG. 2, two of the opposing sides of the housing 10 are provided with annular openings 11 and 12. A fluid inlet 14 is also provided for admitting air into the housing 10. Air may be suitably conveyed to the fluid inlet 14 by means of conventional ductwork 15, as is shown in FIGS. 1 and 2. A fluid outlet 16 is also shown in FIGS. 1 and 2 for exhausting filtered air from the housing 10 in a manner which will be explained in further detail below. Positioned within the housing 10 is a cylindrical drum 20. Drum 20 is mounted for rotational movement within housing 10 by means of roller assemblies 23 and 24 positioned on each opposing end of drum 20. The roller assemblies 23 and 24 on one side of housing 10 are shown in FIG. 2. The other side of drum 20 is mounted in an identical manner. Drum 20 is driven by means of a roller chain 25 fixedly secured to one circumferential edge thereof. Chain 25 is matingly engaged by a sprocket gear 26 which is driven conventionally by an electric motor.

Drum 20 is formed of expanded metal welded to a cylindrical skeleton. Of course, the amount of support given drum 20 by its underlying skeleton is dependent primarily on the weight it must support without distortion of its cylindrical configuration. Over the expanded metal surface of drum 20 is placed a closely fitting nylon or stainless steel mesh 21 which is intended primarily to filter the larger particles of dust from the air moving therethrough. The surface of drum 20 and the overlying mesh fabric 21 thus define a filter support (broad reference numeral 22) for the formation of an overlying porous layer of dust into a mat "M" which serves as the primary filter.

Positioned within drum 20 is a shroud 30. The shroud 30 forms a physical barrier between the downstream sides of the filter making and filtration zones in housing 10, as will be explained in more detail below. Shroud 30 is held in stationary position against the rotation of drum 20 by means of a pair of opposing end caps 31 and 32, which comprise large, shallow, cylindrical "pans" which are slightly smaller in their outside diameters than the inside diameter of drum 20. End caps 31 are positioned in annular opening 11, as is shown in FIG. 2 and are held in stationary position by upright supports 34 and 35. The lower edge of shroud 30 is welded, bolted or otherwise suitably secured against movement to the inner surface of end cap 31. End cap 32 is positioned in annular opening 12, and maintained against movement by upright supports (not shown). Likewise, the adjacent end of shroud 30 is fixedly secured to end cap 32 and thereby secured against movement.

Figure 5:
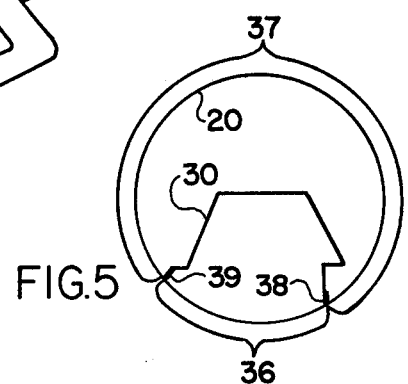
FIG. 5 indicates the areas within the housing defining the filter making and filtration zones, respectively.
Figure 4:
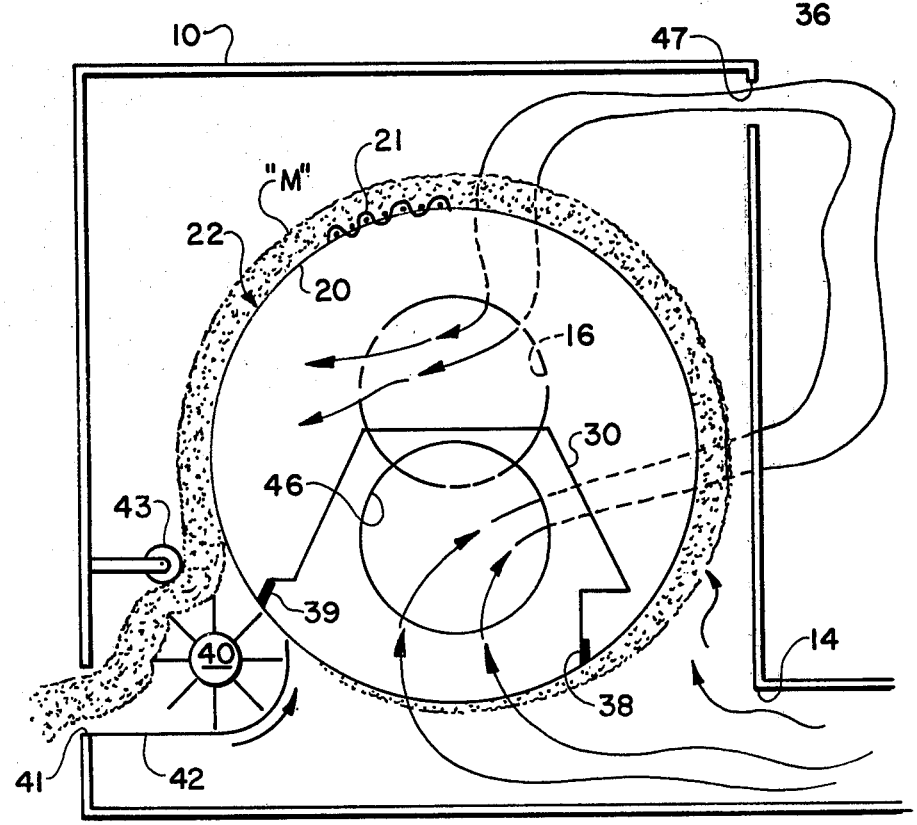
FIG. 4 is a schematic cross-sectional view of a preferred embodiment of the apparatus according to the present invention.

Seals 38 and 39, comprising elongate strips of flexible rubber or plastic-like material, are secured to the longitudinally extending, laterally opposing edges of shroud 30, as is shown in FIGS. 2 and 4, and sealingly engage the inner circumferential surface of drum 20 along its length. Thus, the interior of shroud 30 and the remainder of the space enclosed by drum 20 are sealed against inner-communicating fluid flow. The area defined within drum 20 which is sealingly enclosed by the shroud 30 defines the downstream side of a filter making zone 36. The remainder of the interior of drum 20 which is not enclosed within shroud 30 therefore defines the downstream side of a filtration zone 37 within which the primary filtering operation carried out by this invention takes place. The entire filter making zone 36 is defined on the upstream side of cylindrical drum 20 from the filtration zone 37 only by fluid flow; and on the downstream side by the physical barrier of the shroud 30 and seals 38 and 39. The areas within the housing 10 defined by the filter making zone 36 and the filtration zone 37, respectively, are indicated in FIG. 5.

Shown in FIG. 4 is a doffing mechanism, comprising a doffer roll 40 having a plurality of radially outwardly extending rubber flaps 40a. The doffer roll 40 rotates counterclockwise, causing rubber flaps 40a to successively scrape against the outer surface of drum 20, removing the fiber mat "M" from drum 20 and through a waste outlet 41. Intercommunication of air between the filter making zone 36 and waste outlet 41 is prevented at the doffer roll 40 by means of a curved shield 42 which projects inwardly from the waste outlet 41 into close, spaced-apart relation to the outer surface of drum 20. The radially, outwardly extending rubber flaps 40a on the doffer roll 40 are spaced sufficiently close together that sealing contact between the rubber flaps 40a and the outer surface of drum 20 is maintained at all times.

Communication of air within the filtration zone 37 through the waste opening 41 is prevented by means of a polished, stainless steel roller 43 which very gently engages the fiber mat "M" as it is being removed from drum 20 by the doffer roll 40.

Drum 20, duffer roll 40 and steel roller 43 are rotated periodically in response to a pre-determined pressure drop across drum 20 in the filter making zone 36, i.e. between the area enclosed within shroud 30 and the radially contiguous area outside drum 20 but inside housing 10. A pressure sensor 45, shown in FIG. 2, compares the air pressure on either side of drum 20 within the area described above. When the pressure differential exceeds a pre-determined figure, drum 20 and doffer roll 40 are rotated counterclockwise and the steel roller 43 clockwise. The doffer roll 40 strips the fiber mat "M" from a laterally extending segment of drum 20. This bare segment then passes doffer roll 40 and the adjacent seal 39 into the filter making zone 36. Of course, the pressure differential drops rapidly as the bare filter passes into the filter making zone 36. This drop in pressure differential is sensed by pressure sensor 45, stopping the rotation of drum 20, doffer roll 40 and steel roll 43.

In the preferred embodiment of the invention disclosed herein, the air which is filtered through the filter support in the filter making zone 36 is filtered a second time in the filtration zone through the filter support 22 and the fiber mat "M" resting thereon. The air is conveyed from the downstream side of the filter making zone within the shroud 30 to the upstream side of the filtration zone by means of an annular opening 46 in end cap 32. The annular opening 46 communicates with a conventional sheet metal duct 48 which conveys the air to a filtration zone inlet 47, as is shown in FIG. 1.

Preferably, the air from the downstream side of the filter making zone 36 is conveyed into the upstream side of the filtration zone 37 by means of a fan 50 positioned within duct 48.

Likewise, air in the downstream side of the filtration zone is exhausted from the filter through the annular opening 16 by means of another fan 55 enclosed within a duct 56.

Air leakage between housing 10 and drum 20 on either side thereof is prevented by means of an annular seal 60 which is made of rubber or a pliable plastic material and which engages housing 10 defining the annular opening 11, and the opposing end portions of the drum 20. Likewise, leakage is prevented around end caps 31 and 32 and the interior diameter of drum 20 by means of an annular seal 61 made of a rubber or a pliable plastic material which engages the side walls of end caps 31 and 32, respectively, and the interior edge of drum 20. Seals 60 and 61 are sufficiently flexible to engage tightly against their respective bearing surfaces, but to permit rotation of drum 20 without fluid leakage. The placing of a small amount of lubricant between seals 60 and 61 and their respective bearing surfaces aids in creating an airtight seal while decreasing the surface friction while drum 20 is rotating.

Prior to the operation of the apparatus at maximum efficiency, a fiber mat must be allowed to accumulate. It has been determined that a thickness of approximately 3.8 cm. to 5 cm. is sufficient to provide very high quality air filtration when filtering conventional textile fibers and dust.

In order to filter at maximum efficiency, the entire portion of the filter support 22 residing within the filtration zone 37 must be completely covered with a mat of accumulated fibers and dust to a pre-determined minimum thickness. This is accomplished by passing lint and dust laden air into the housing 10 through the inlet 14. The drum 20 is not rotated until the desired thickness is achieved. If desired, the air which is being filtered while the fiber mat is being built on the filter support 22 can be recirculated through the filter repeatedly until the minimum fiber mat thickness is achieved.

This procedure simultaneously prevents the introduction into the environment of relatively dirty air and at the same time increases the rate at which the fiber mat is built. Once the fiber mat is at the preferred thickness, the filter apparatus begins operating at optimum efficiency. As is illustrated in FIG. 4, air enters the filter through the inlet 14. Since the area of the filter support 22 adjacent the seal 39 is clean, having just been doffed by the doffer roll 40, most of the air will tend to migrate towards and pass through this clean section because of the relatively low pressure drop. However, some air will pass through other sections of the filter support 22 within the filter making zone 36, as is also illustrated. All of the air which passes through the filter support 22 in the filter making zone 36 travels axially along the shroud 30 from its point of entry to annular opening 46 and into duct 48 where it is conveyed to the filtration zone inlet 47. Entering the filtration zone 37 along the length of the cylindrical drum 20, the air passes through the fiber mat "M" residing on the filter support 22. It is at this stage that the high efficiency filtration takes place. Because the fiber mat is of a uniform thickness throughout the surface area of the filter support 22 within the filtration zone 37, filtration is of a uniformly high quality and the fiber mat "M" is maintained at a very even thickness.

Surprisingly, it has been learned that if care is taken to ensure that the fiber mat "M" is of optimum thickness when it passes out of the filter making zone 36 into the filtration zone 37, the capacity of the filter apparatus can be increased by permitting some of the raw air from the inlet 14 to pass directly into the filtration zone 37 and through the fiber mat "M" therein. This is also illustrated in FIG. 4 by the arrows indicating air flow. As a result of this procedure, the stream of raw air is "split" as it approaches the fiber mat "M". Most of the air seeks out the section of relatively clean filter support 22 adjacent seal 39. Some of the other air enters the filter making zone 36 closer to seal 38. Finally, the remaining air, which is prevented by back pressure from entering into the upstream side of the filter making zone 36, passes through the fiber mat in the filtration zone 37. In either case, the air is filtered very efficiently for the following reasons.

Air passing through the filter support 22 adjacent seal 39 deposits only its largest fiber and dust particles on the screen 21. The remaining particles, including most of the very fine dust and fiber particles, are filtered from the air after it has been conveyed into the upstream side of the filtration zone 37 and thence through the fiber mat "M" into the downstream side of the filtration zone 37. As the point of entry of the air through the fiber mat "M" in the filter making zone 36 approaches the seal 38, the percentage of smaller fibers and dust particles which are filtered out of the air increases. The fiber mat "M" is allowed to increase in thickness to the point where the maximum filtration efficiency is achieved just inside the filter making zone 36 adjacent the seal 38. Hence, the fiber mat "M" in the filter making zone 36 directly adjacent the seal 38 possesses the same high rate of filtration capacity as does the fiber mat "M" in the filtration zone 37 immediately adjacent the seal 38. In this way, the thickness of the fiber mat "M" in the filtration zone 37 guarantees that the larger dust and fiber particles which would have, in any event, been removed had the air first passed through the filter making zone 36, are removed along with the much finer particles.

It has been determined experimentally that air can be "overfed" into the filter such that 30% of the air passes through the fiber mat "M" within the filtration zone 37 and is thus filtered only once. The remaining 70% of the air is filtered twice—once in the filter making zone 36 and once in the filtration zone 37. In either case, the apparatus according to the method of this invention functions so that no air exits the filter until it has passed at least once through the fiber mat "M" at a point of optimum thickness and optimum filtration efficiency.

If desired, air can be "underfed" into the filter, causing it to be recirculated several times. More and smaller dust particles are removed by each pass through the mat "M", but at the cost of reduced capacity and greater energy consumption.

There are a number of other advantages which have resulted from the filter construction and method described above. Whereas in prior art filters, care was taken to pass the air tangentially around the circumference of a drum filter in order to remove as much particulate matter as possible from the air prior to its reaching the section of clean filter, in the apparatus and method according to the present invention, air can be directed at the filter mat "M" at right angles without any measurable loss of filtration efficiency. Also, elimination of chamber separators and the creation of "zones" in the upstream sides of the filter has also eliminated the need for baffles or air deflectors in the air path in order to distribute the fiber mat evenly over the filter support. As a result, resistance to air flow is decreased, enabling more air to be circulated through the filter with less consumption of energy. Also, elimination of baffles and air deflectors has greatly decreased "down time" required for cleaning lint and dust from interior parts.

Rotation of drum 20 which is necessary to successively clean axially extending strips of fiber mat "M" from the filter support 22 can be accomplished in a variety of ways. If the volume and particulate content of the air being filtered is relatively constant, the time required to build a fiber mat to its optimum thickness can be determined empirically. Then, a simple motor speed control can serve to constantly rotate the drum at the desired speed. In areas where variable air flow or particulate content is anticipated, the pressure senser 45, described above, can be utilized.

With an overall filter size of 8 feet, 4 inches (254 cm.) high, by 7 feet, 8 inches (234 cm.), by 8 feet 10 inches (269 cm.), approximately 20,000 cubic feet (566 cubic meters) per minute can be filtered with an average energy consumption of about 40 horsepower (40 metric horsepower).

The principle on which the filter operates lends itself to a variety of constructions and uses. For example, the same principles described above can be applied to filtering apparatus having flat, rotatable filter "discs", endless bands and the like. A first fluid flow can be used to build a filter mat for use in filtering a second fluid flow. The apparatus and method according to the present invention can be adapted for filtration of other fluids, such as water. Likewise, modification of the apparatus can be accomplished to permit filtration of other particulates, such as coal dust, plaster or cement dust, among others.

Finally, the simplicity of design of the filter apparatus lends itself to large increases or decreases in size necessary to accomplish different tasks.

An apparatus and method for filtering fluids is described above. Various details of the invention may be changed without departing from its scope. Furthermore, the foregoing description of a preferred embodiment of the apparatus and method according to the present invention is provided for the purpose of illustration only and not for the purpose of limitation—the invention being defined by the claims.

I claim:

1. An apparatus for separating entrained particulate matter from a conveying fluid wherein particulate matter is collected and deposited in an overlying porous layer on an upstream side of a fluid-permeable filter support and wherein the porous layer of particulate matter is used as a filtering medium of enhanced filtering capacity; and consisting essentially of:
   (a) an enclosed housing having a fluid inlet and a fluid outlet therein;
   (b) said filter support being positioned within said enclosed housing for removing at least some entrained particulate matter from fluid as fluid is passed through the filter support from the upstream side to the downstream side thereof;
   (c) a filter making zone defined within said enclosed housing by a fluid flow into said fluid inlet and through a first pre-determined part of said filter support from the upstream to the downstream side thereof for collecting the entrained particulate matter into said overlying porous layer;
   (d) a filtration zone defined within said enclosed housing by a fluid flow through a second pre-determined part of said filter support from the upstream to the downstream side thereof and through said fluid outlet, the second pre-determined part of said filter support having thereon the overlying porous layer of particulate matter made in the filter making zone;
   (e) chamber means defined by walls positioned on the downstream side of said filter support at the juncture of said filter making zone and said filtration zone said walls defining on one side thereof said filter making zone and on the other side thereof said filtration zone and sealingly engaging the downstream side of said filter support against fluid flow therebetween on the downstream side thereof but omitting sealing means between the interior of the enclosed housing and said filter support at the juncture of the filter making zone and the filtration zone; and, (f) conduit means for conveying fluid from said filter making zone on one side of and from said chamber defined by said walls into the housing on the upstream side of the filtration zone;

whereby said filter making zone and said filtration zone are physically defined on the downstream side of said filter support by said chamber means and effectively but not physically defined on the upstream side of said filter support by fluid flow.

2. An apparatus according to claim 1, and including drive means for moving the filter support in the filter making zone and the overlying porous layer thereon into said filtration zone.

3. An apparatus according to claim 1, wherein said filter support comprises a cylindrical drum rotatably mounted in said housing.

4. An apparatus according to claim 1, and including fluid pumping means operatively communicating with said enclosed housing for inducing a flow of fluid into said enclosed housing through the inlet and out of said enclosed housing through the outlet.

5. An apparatus according to claim 1, and including doffing means for removing the layer of particulate matter from said filter support upon completion of its passage through said filtration zone.

6. An apparatus according to claim 5, and including means responsive to a pre-determined decrease in fluid pressure within the downstream side of said filter making zone incident to the buildup of particulate matter on the filter support positioned therein for actuating said doffing means, thereby removing particulate matter from said filter support to permit an increase in the fluid pressure on the downstream side of said filter making zone and deactuating said doffing means.

7. An apparatus for separating entrained particulate matter from a conveying fluid wherein particulate matter is collected and deposited in an onverlying porous layer on an upstream side of a fluid-permeable filter support and wherein the porous layer of particulate matter is used as a filtering medium of enhanced filtering capacity; and consisting essentially of:

(a) an enclosed housing having a fluid inlet and a fluid outlet therein;

(b) said filter support comprising a cylindrical drum rotatably positioned within said enclosed housing for removing at least some entrained particulate matter from fluid as fluid is passed through said filter support from the upstream side to the downstream side thereof;

(c) chamber means defined by walls positioned within said rotating drum on the downstream side of said filter support and defining on one side of said walls a filter making zone through a first pre-determined part of said cylindrical drum on the downstream side thereof for collecting the entrained particulate matter into said overlying porous layer and a filtration zone on the other side of said walls through a second pre-determined part of said cylindrical drum on the downstream side thereof, said chamber means sealingly engaging with said cylindrical drum on the interior thereof at the juncture of the filter making zone and the filtration zone for preventing inter-communication of fluid from said filter making zone and said filtration zone on the downstream side only of said cylindrical drum, and omitting sealing means between the interior of the enclosed housing and said filter support at the juncture of the filter making zone and the filtration zone, the second pre-determined part of said cylindrical drum having thereon the overlying porous layer of particulate matter made in said filter making zone, said filter making zone and said filtration zone being defined on the upstream sides thereof by fluid flow;

(d) conduit means for conveying fluid from said filter making zone on one side of and from said chamber defined by said walls into the housing on the upstream side of the filtration zone;

(e) drive means for rotating said cylindrical drum at a pre-determined rate, respectively, through said filter making zone for collecting on the outer surface of the cylindrical drum said overlying porous layer of particulate matter to be used as additional filter medium of enhanced filtering capacity in said filtration zone, and through said filtration zone for filtering fluid through said cylindrical drum and the overlying porous layer of particulate matter thereon; and, (f) doffing means for cleaning said cylindrical drum by removing said porous layer of particulate matter therefrom upon completion of its passage through said filtration zone whereby said filter making zone and said filtration zone are physically defined on the downstream side of said filter support by said chamber means and effectively but not physically defined on the upstream side of said filter support by fluid flow.

* * * * *